(No Model.)
G. A. WILSON.
PRINTING CYLINDER OF ROTARY PRINTING MACHINES.
No. 301,942. Patented July 15, 1884.
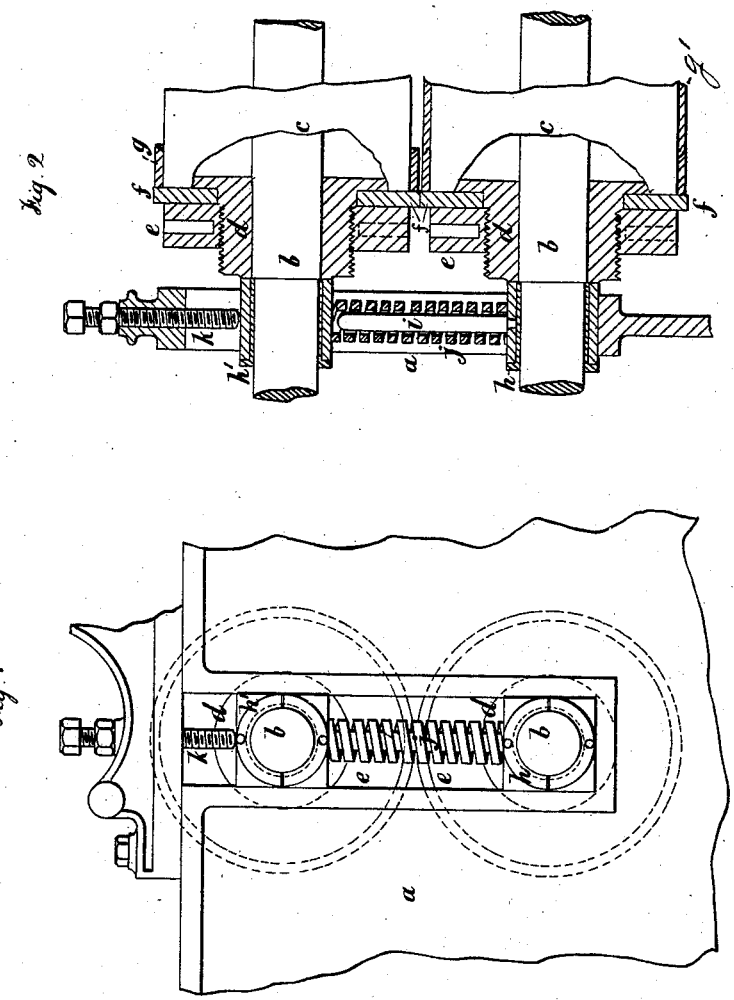
Witnesses
Charles Collins
James Johnson
Inventor
George Ashley Wilson

UNITED STATES PATENT OFFICE.

GEORGE ASHLEY WILSON, OF LIVERPOOL, COUNTY OF LANCASTER, ENGLAND.

PRINTING-CYLINDER OF ROTARY PRINTING-MACHINES.

SPECIFICATION forming part of Letters Patent No. 301,942, dated July 15, 1884.

Application filed August 23, 1883. (No model.) Patented in England July 17, 1883, No. 3,502.

*To all whom it may concern:*

Be it known that I, GEORGE ASHLEY WILSON, a subject of the Queen of Great Britain, residing at Liverpool, in the county of Lancaster, England, have invented a new and useful Improvement in the Printing-Cylinders of Rotary Printing-Machines, (for which I have obtained a patent in Great Britain, No. 3,502, bearing date July 17, 1883, and nowhere else,) of which the following is a specification.

The invention relates to the cylinders of rotary printing-machines whereby printing is effected—that is to say, to the stereotype and blanket cylinders, between which the paper passes while being printed. Hitherto the locking mechanism for holding the stereotype and blankets in place on the cylinders has been secured to the shafts carrying the said cylinders, thereby necessitating the use of shafts of large diameter, which were both expensive and unwieldy, or the parts were left too weak to do their work properly. Moreover, such construction was not adapted to allow of advantageous means being used for adjusting and regulating the distance between the said cylinders.

Now, the object of my invention is to overcome the disadvantages above mentioned by constructing cylinders with increased strength and durable locking appliances, instead of such appliances being connected to the shafts, and providing fit means for accurate and ready adjustment of the cylinders the required distance apart.

The accompanying drawings illustrate the means of carrying my improvements into effect.

Figure 1 is an end view of the bearings of the stereotype and impression cylinders, showing the devices for adjusting the rolls, the rolls being indicated by dotted lines. Fig. 2 is a detail sectional view of the devices, the shaft *b* and portions of rolls *c* being shown in elevation, while the necks *d* and part of the end of rolls *c* are shown in section.

Like letters refer to like parts wherever they occur.

*a* is the frame-work; *b*, shafts of stereotype and impression cylinders; *c*, cylinders, each cast in one piece with the necks *d*, so as to be strong and durable and fit the shaft close to the bearings and prevent flexure. Though the necks *d* are shown in section, while part of the body of the roll *c* is shown in elevation, it is to be understood that *c* and *d* are cast together and are integral. The said necks are formed with a screw-thread, on which fit the nuts *e*, which hold the locking-collars *f* against the stereotype-gripping rings *g* or against the blanket *g'*. *h h'* are bearings fitting close to the necks *d*, and free to slide in slots in the frame *a*; *i*, guides carried by the bearings *h* and supporting the spiral springs *j*, which react against the bearings *h h'*, so as to separate the cylinders from each other; *k*, set-screws passing through the frame *a* and abutting against the bearings *h'*. The combined action of the set-screws *k* and springs *j* allows of ready and accurate adjustment of the positions of the cylinders *b*. The locking-collars *f* prevent the cylinders from being forced too near together.

It will be obvious that although only one end of the cylinder is shown both ends are constructed and fitted alike.

I claim—

1. The combination of the shafts *b*, cylinders *c*, cast with necks *d*, and fitted with nuts *e*, and locking-collars *f*, substantially as set forth.

2. A cylinder for rotary printing-machines, having necks integral therewith, in combination with locking-collars which encircle the necks of the cylinders, and mechanism, substantially as described, for holding the locking-collars, substantially as and for the purposes specified.

GEORGE ASHLEY WILSON.

Witnesses:
CHARLES COLLINS,
JAMES JOHNSON.